(12) United States Patent
Adams et al.

(10) Patent No.: US 7,715,593 B1
(45) Date of Patent: May 11, 2010

(54) METHOD AND SYSTEM FOR CREATING AND OPERATING BIOMETRICALLY ENABLED MULTI-PURPOSE CREDENTIAL MANAGEMENT DEVICES

(75) Inventors: William Mark Adams, Mount Laurel, NJ (US); John Robert Coyne, Bridgewater, CT (US); Christopher Andrew Coyne, New York, NY (US); Raymond Munson Wallace, Doylestown, PA (US)

(73) Assignee: Uru Technology Incorporated, Great Falls, VA (US)

( * ) Notice: Subject to any disclaimer, the term of this patent is extended or adjusted under 35 U.S.C. 154(b) by 806 days.

(21) Appl. No.: 10/867,897

(22) Filed: Jun. 15, 2004

Related U.S. Application Data

(60) Provisional application No. 60/478,363, filed on Jun. 16, 2003.

(51) Int. Cl.
G06K 9/00 (2006.01)

(52) U.S. Cl. ........................ 382/115; 382/116; 382/124; 340/5.53; 340/5.83

(58) Field of Classification Search ................ 382/124, 382/115, 116, 305, 306; 600/587; 340/5.53, 340/5.83
See application file for complete search history.

(56) References Cited

U.S. PATENT DOCUMENTS

| 4,993,068 | A |   | 2/1991  | Piosenka et al. |
|-----------|---|---|---------|-----------------|
| 5,229,764 | A | * | 7/1993  | Matchett et al. ............ 340/5.52 |
| 5,546,471 | A |   | 8/1996  | Merjanian       |
| 5,598,474 | A |   | 1/1997  | Johnson         |
| 5,623,552 | A |   | 4/1997  | Lane            |
| 5,748,737 | A | * | 5/1998  | Daggar ........................ 705/41 |
| 6,016,476 | A |   | 1/2000  | Maes et al.     |
| 6,041,410 | A |   | 3/2000  | Hsu et al.      |
| 6,084,967 | A |   | 7/2000  | Kennedy et al.  |
| 6,088,585 | A |   | 7/2000  | Schmitt et al.  |
| 6,182,221 | B1|   | 1/2001  | Hsu et al.      |
| 6,307,956 | B1|   | 10/2001 | Black et al.    |
| 6,325,285 | B1|   | 12/2001 | Baratelli       |
| 6,325,292 | B1| * | 12/2001 | Sehr ........................... 235/492 |
| 6,382,516 | B1|   | 5/2002  | King            |
| 6,453,301 | B1|   | 9/2002  | Niwa            |

(Continued)

FOREIGN PATENT DOCUMENTS

EP  0969644 A  1/2000

(Continued)

OTHER PUBLICATIONS

Komatsubara, Ken; "Maruchi Baiometorikusu Ninsho Sisutemu ga Aitsugu (A Wave of Multi-Biometrics Authentication System)"; Nikkei Internet Technology; Japan: Nikkei BP, Inc.; Mar. 22, 2001, No. 45; pp. 16-17.

(Continued)

*Primary Examiner*—John B Strege
(74) *Attorney, Agent, or Firm*—Nelson R. Capes; Briggs & Morgan, P.A.

(57) ABSTRACT

A method and system used to integrate and control multiple secure credentialing approaches including magnetic stripes, bar codes, contact and contactless SmartCard chips, Short Message Systems (SMS), Global Positioning Systems (GPS), vicinity type Radio Frequency Identification Devices (RFID), and proximity type RFID, into compact, self-powered, biometrically-protected devices.

47 Claims, 9 Drawing Sheets

U.S. PATENT DOCUMENTS

| | | | |
|---|---|---|---|
| 6,483,929 B1 | 11/2002 | Murakami et al. | |
| 6,484,260 B1 * | 11/2002 | Scott et al. | 713/186 |
| 6,547,130 B1 | 4/2003 | Shen | |
| 6,804,357 B1 * | 10/2004 | Ikonen et al. | 380/241 |
| H2120 H * | 7/2005 | Cudlitz | 235/382 |
| 7,013,393 B1 * | 3/2006 | Stevens | 726/9 |
| 7,142,840 B1 * | 11/2006 | Geddes et al. | 455/411 |
| RE39,736 E * | 7/2007 | Morrill, Jr. | 705/44 |
| 2001/0017584 A1 * | 8/2001 | Shinzaki | 340/5.52 |
| 2001/0026632 A1 * | 10/2001 | Tamai | 382/116 |
| 2001/0040987 A1 * | 11/2001 | Bjorn et al. | 382/124 |
| 2002/0030582 A1 | 3/2002 | Depp et al. | |
| 2002/0039063 A1 | 4/2002 | Ritter | |
| 2002/0043566 A1 * | 4/2002 | Goodman et al. | 235/492 |
| 2002/0049967 A1 * | 4/2002 | Haseltine et al. | 725/23 |
| 2002/0091937 A1 * | 7/2002 | Ortiz | 713/200 |
| 2002/0097142 A1 | 7/2002 | Janiak et al. | |
| 2002/0111213 A1 | 8/2002 | McEntee et al. | |
| 2002/0122571 A1 | 9/2002 | Bradley | |
| 2002/0133725 A1 * | 9/2002 | Roy et al. | 713/202 |
| 2002/0140542 A1 * | 10/2002 | Prokoski et al. | 340/5.52 |
| 2002/0145507 A1 * | 10/2002 | Foster | 340/5.53 |
| 2002/0147588 A1 * | 10/2002 | Davis et al. | 704/246 |
| 2002/0150282 A1 * | 10/2002 | Kinsella | 382/124 |
| 2002/0190960 A1 | 12/2002 | Kuo | |
| 2003/0013483 A1 | 1/2003 | Ausems | |
| 2003/0057278 A1 * | 3/2003 | Wong | 235/451 |
| 2003/0115490 A1 | 6/2003 | Russo et al. | |
| 2003/0167207 A1 * | 9/2003 | Berardi et al. | 705/16 |
| 2003/0179073 A1 | 9/2003 | Ghazarian | |
| 2003/0189481 A1 | 10/2003 | Hamid | |
| 2003/0223625 A1 | 12/2003 | Hillhouse et al. | |
| 2004/0006593 A1 | 1/2004 | Vogler et al. | |
| 2004/0010449 A1 * | 1/2004 | Berardi et al. | 705/16 |
| 2004/0014457 A1 | 1/2004 | Stevens | |
| 2004/0061593 A1 | 4/2004 | Lane | |
| 2004/0123106 A1 | 6/2004 | D'Angelo et al. | |
| 2004/0129787 A1 | 7/2004 | Saito et al. | |
| 2004/0139329 A1 | 7/2004 | Abdallah et al. | |
| 2004/0172403 A1 | 9/2004 | Steele et al. | |
| 2004/0177045 A1 | 9/2004 | Brown | |
| 2004/0179718 A1 | 9/2004 | Chou | |
| 2004/0188519 A1 * | 9/2004 | Cassone | 235/382 |

FOREIGN PATENT DOCUMENTS

| | | |
|---|---|---|
| EP | 1 139 301 A | 10/2001 |
| EP | 1 170 704 A | 1/2002 |
| EP | 1 244 043 A | 9/2002 |
| EP | 1257111 A | 11/2002 |
| JP | 63163589 | 7/1988 |
| JP | 2118790 | 5/1990 |
| JP | 2002-44727 | 2/2002 |
| JP | 2002-331912 | 11/2002 |
| TW | 504652 B * | 1/2002 |
| WO | WO-95/13591 | 5/1995 |
| WO | WO-99/06928 | 2/1999 |
| WO | WO 99/56429 A | 11/1999 |
| WO | WO 02/27454 A1 | 4/2002 |
| WO | WO 02/49322 A | 6/2002 |
| WO | WO 02/084602 A1 | 10/2002 |
| WO | WO 03/017244 A | 2/2003 |
| WO | WO 03/017244 A1 | 2/2003 |
| WO | WO 03/029942 A | 4/2003 |

OTHER PUBLICATIONS

URU Technology, Inc.: Summary, Internet http://web.archive.org/web/20011212005626/http://divacard.com/index.html; online Dec. 12, 2001.

* cited by examiner

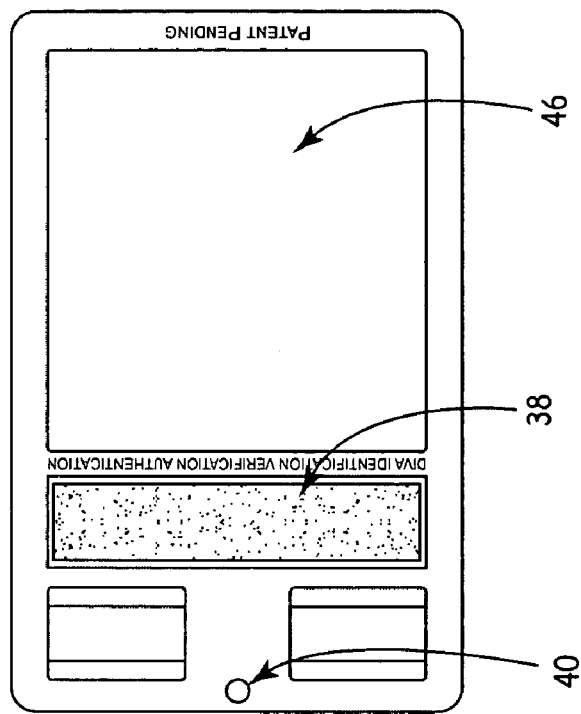
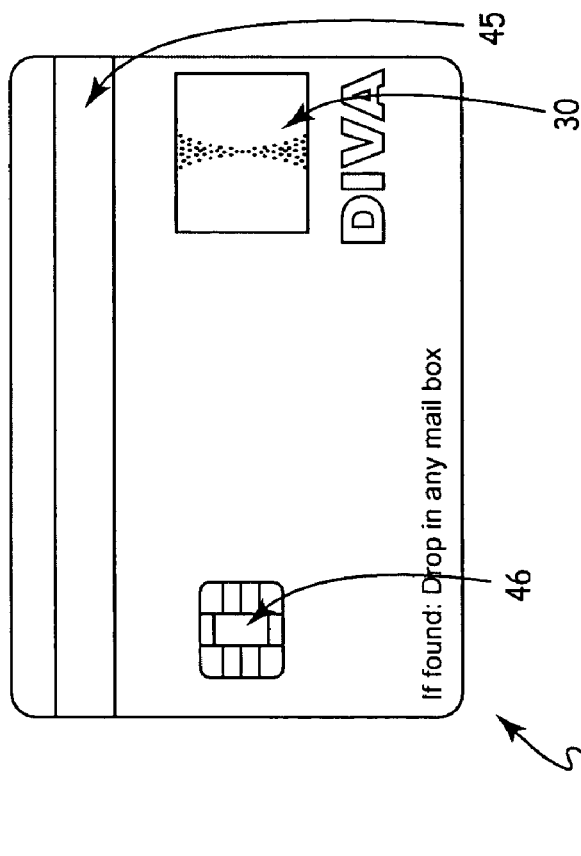
FIG. 2A
FIG. 2B

METHOD AND SYSTEM FOR CREATING AND OPERATING BIOMETRICALLY ENABLED MULTI-PURPOSE CREDENTIAL MANAGEMENT DEVICES

This application is a continuation-in-part of and claims priority from U.S. Provisional Patent Application Ser. No. 60/478,363 filed on Jun. 16, 2003 for a METHOD AND SYSTEM FOR CREATING AND OPERATING BIOMETRICALLY ENABLED MULTI-PURPOSE CREDENTIAL MANAGEMENT DEVICES.

BACKGROUND OF THE INVENTION

The present invention relates to a method and system used to integrate and control multiple secure credentialing approaches including magnetic stripes, bar codes, contact and contactless SmartCard chips, Short Message Systems (SMS), Global Positioning Systems (GPS), vicinity type Radio Frequency Identification Devices (RFID), and proximity type RFID, into compact, self-powered, biometrically-protected and enabled devices.

SUMMARY OF THE INVENTION

The invention 10 consists of a Digital Identification Verification Authentication—Personal Identification Device (DIVA-PID 12) and an enrollment system 14 that also enables instant identification and verification through the application of a single finger or a group of fingers in a pre-arranged order of the device holder and their credentials for selected applications. The DIVA-PID 12 protects the personal biometric data of the user by utilizing a one-to-few match to release the holder's credential but not the fingerprint image.

The released credential enables multi-purpose applications. The invention is used to capture the results of personal background checks with appropriate authorities to verify and authenticate the status of an individual, transform this data into an encrypted, secure personal credential, transfer this credential onto the device and subsequently verify the user to the device.

Only the user can energize the device 12 (i.e., none of the internal systems: memory, processor, communication links and applications can be activated until the device detects the valid fingerprint of the card holder) by a fingerprint driven biometric system. Applications of the device include visual and electronic personal identification for access control, financial transactions, loyalty or membership programs, employee identification, passport, VISA, driver's license and government identification credentials.

A principle object and advantage is that this invention allows credentialing enrollment authorities, device owners, and point of use applications to establish and define control over the access and transfer of credential and access control information through unique processes and equipment.

Another object and advantage of the present invention is that this invention protects individual civil liberties while enabling the positive identification of the owner to the credential management device without the use of external power, human, or electronic detection means.

Another object and advantage of the present invention is that the credential management device is visually unidentifiable, inaccessible, and unusable except when energized by the owner.

Another object and advantage of the present invention is that the invention creates a method for providing secure, private, and efficient access and transaction account control that can interact with an assortment of deployed infrastructures or new infrastructures including automated teller machines (ATMs), point-of-sale (POS) terminals, SmartCard contact and contactless terminals, radio frequency terminals, short message services (SMS), Global Positioning Systems (GPS), magnetic stripe readers, and bar code scanners (without the need to validate the user through an independent system the distinction being that the user is authenticated on the card without needing to interface with another system).

Another object and advantage of the present invention is that the DIVA-PID invention can be manufactured and integrated with (not attached to) small, self-powered form factors such as credit cards, key fobs, pagers, or other similar sized devices.

Another object and advantage of the present invention is that the invention is highly secure since the biometric enabling switch can be activated with various "pass codes" created by using multiple fingers in a pattern. In addition, the release of credentials is encrypted.

Another object and advantage of the present invention is that the invention has a unique manufacturing method that uses pressure sensitive printed materials to create the DIVA-PID core functionality in high volumes. The printed materials allow for flexibility, reliability and infrastructure capability consistent with or exceeding ISO standards governing credit cards and similar devices.

Another object and advantage of the present invention is that the invention allows for unique adaptive applications. Information from interacting with one infrastructure, such as new account credentials obtained via a SmartCard reader connected to a personal computer can interact with another infrastructure, such as using this new account information during a transaction with an ATM or POS terminal through the magnetic stripe emulation.

Another principal object and advantage of the present invention is that the invention integrates numerous credential, access control, and credential transfer techniques into a single device enabled and protected by a fingerprint system allowing the user to self-select the credential or data stored on the device.

Another object and advantage of the present invention is that the invention integrates flexible glass and/or other substrate materials into the device layers to provide dielectric isolation of circuit layers and components to enable the ISO 7816 standard to be met for thickness and flexibility.

Another object and advantage of the present invention is that the device can combine the fingerprint biometric with a secondary biometric such as voice recognition to enhance the security of the device, with the secondary biometric integrated as an integral part of the device.

Another object and advantage of the present invention is that this invention may make use of Tempest shielding to prevent unauthorized access to electronic systems and data through remote electronic eavesdropping.

Another object and advantage of the present invention is that this invention may embody decoy circuits to prevent or delay reverse engineering that would penetrate the internal security of the invention and its data.

Another object and advantage of the present invention is that this invention provides for inter-circuit communication that is internally encrypted to secure the privacy of applications and data (i.e., when data passes from a processor to memory or visa versa on the device, that data transmission is encrypted).

Another object and advantage of the present invention is that this invention detects anomalous behavior through on-board applications that either alert the issuer or disable the invention from continuing use (i.e., on-board means on-card and relies on the internal architecture to allow applications to run on the card).

Another object and advantage of the present invention is that this invention allows the issuer to instantiate multiple types of encryption that can be used in any combination to secure applications and data internally and externally (i.e., there are numerous encryption methods and this means that they are employable because of the card's internal processor and capability to run user defined applications, such as encryption methods).

Another object and advantage of the present invention is that this invention allows for each transmission of data to be uniquely encrypted limiting the effectiveness of eavesdropping on the communication of data and the replication of transmitted data.

BRIEF DESCRIPTION OF THE DRAWINGS

FIG. 2a is a top plan view of a first embodiment of the device of the present invention having a form factor similar to a credit card.

FIG. 2b is a bottom plan view of a first embodiment of the device of the present invention having a form factor similar to a credit card.

FIG. 4 is a schematic of a second embodiment of the present invention having a form factor similar to a key fob.

DETAILED SPECIFICATION

Figure 7:
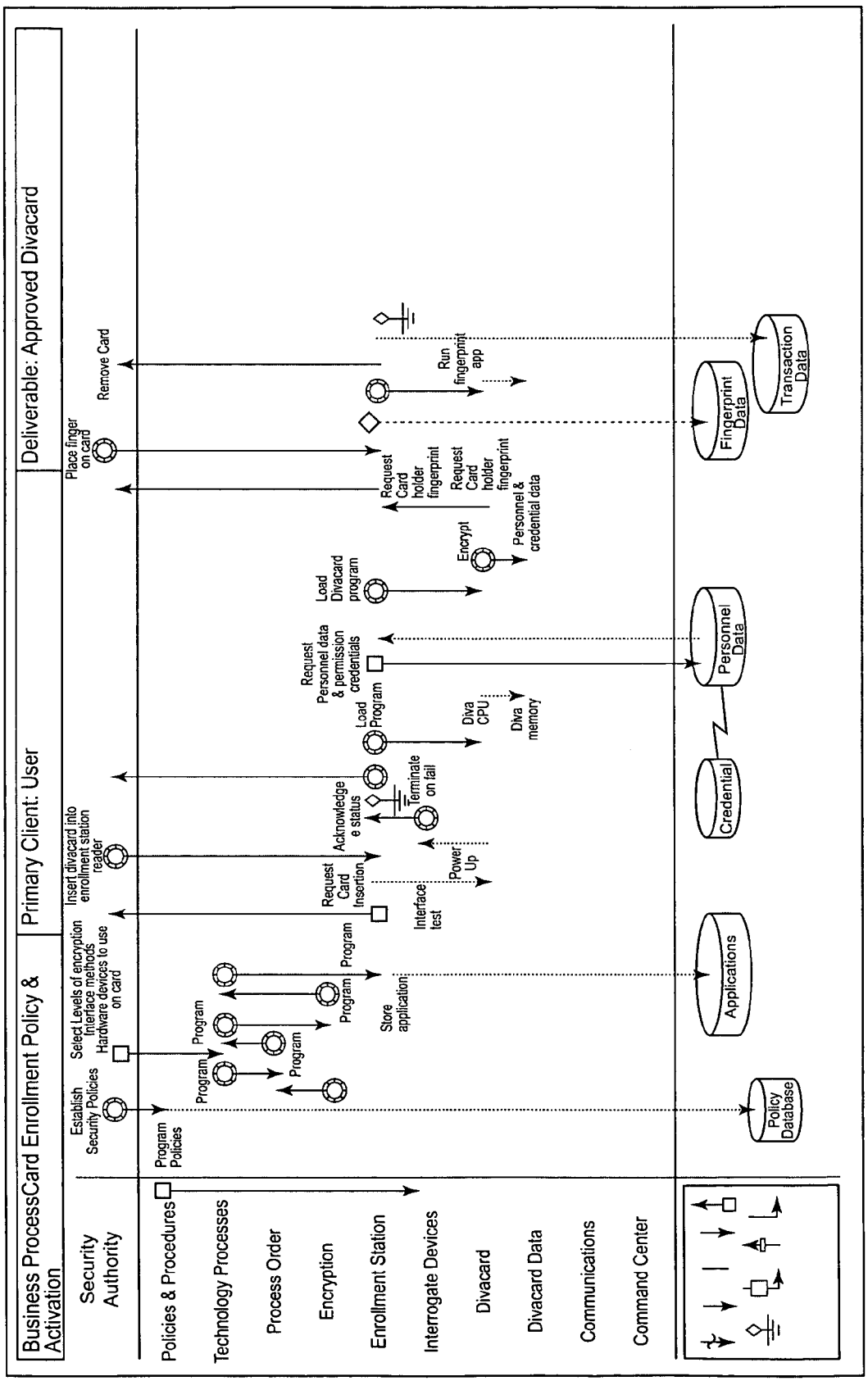
FIG. 7 is a flowchart of the device enrollment method of the present invention.

Please refer to FIG. 7:
Scenario
Policy makers determine access control rules and credential authority. Security Authority sets the technology levels required to allow policy: Timers, power management, encryption, applications to be run, order of processes, communication channels, communication frequencies, update policies, command center controls, transaction logging, panic modes, display data. These are programmed into the enrollment station.

During enrollment, the Enrollment station requests the insertion of a blank Divacard. The card is tested to detect any interface flaws. If it is flawed the transaction is terminated and a new card inserted. The system acknowledges the status on the workstation screen.

The policy and applications that drive the card processes are loaded onto the Divacard and stored in memory.

The enrollment application requests the personnel data from the database.

The data and the credentials associated with the individual and policy are loaded onto the Divacard.

Divacard applications encrypt the data and application.

The Divacard requests a fingerprint to associate with the credential and personnel data.

The enrollment system passes on the request.

The user places their finger on the Divacard embedded fingerprint reader.

The Divacard runs its fingerprint algorithm and encrypts and stores the data on the card.

The enrollment station may optionally store the fingerprint on a database (policy driven).

The transaction is logged on the security transaction database.

The application is terminated.

Figure 8:
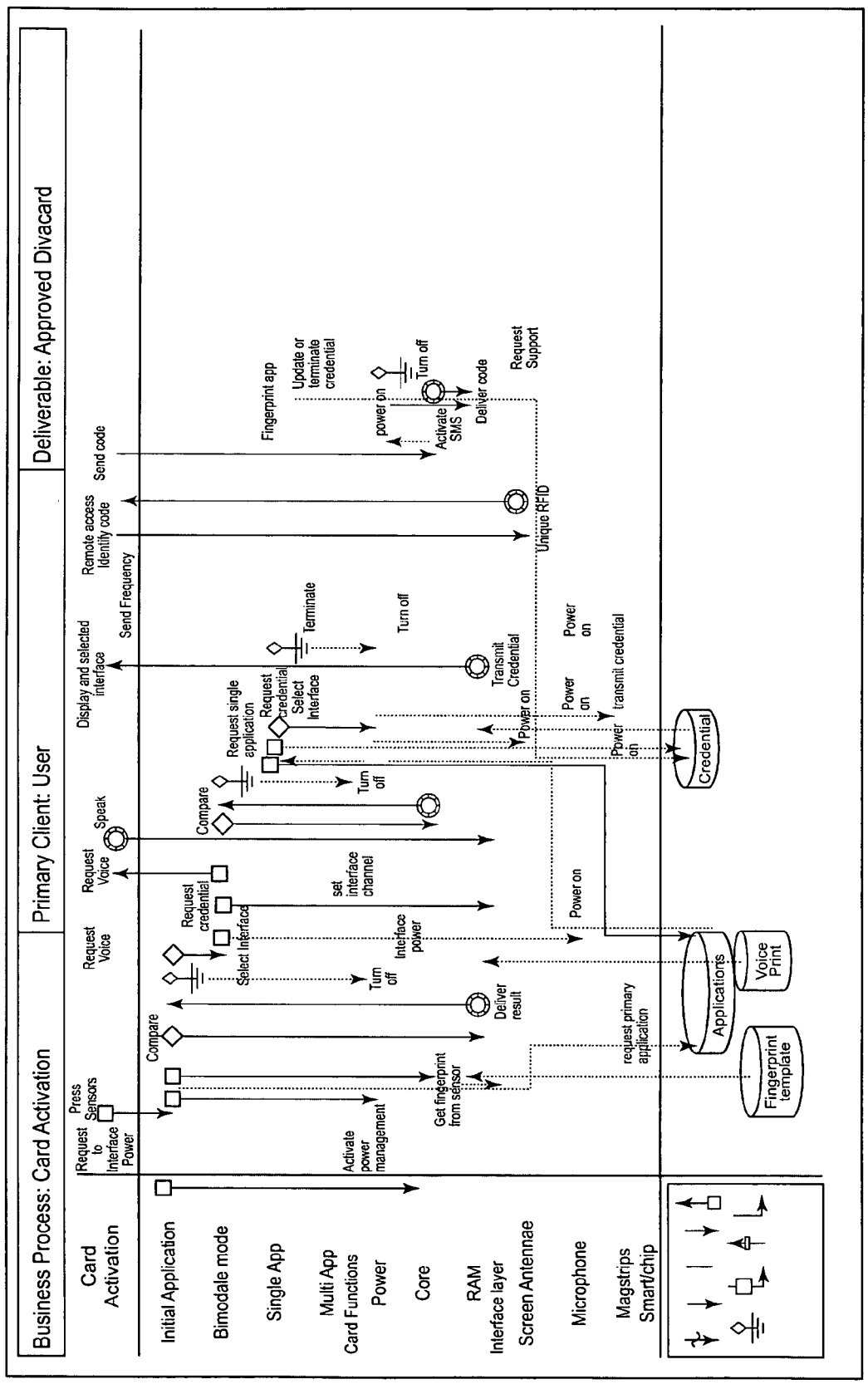
FIG. 8 is a flowchart of the device activation method of the present invention.

Please refer to FIG. 8.

Scenario

1 A User activates the card. Pressing on the finger sensor activates the power. The initial application is loaded and the fingerprint is delivered to RAM for comparison.

The application loads the template from stored memory and if the template is successful then the secondary application is requested and loaded.

On false, the application terminates power.

In Bimodal Mode the application powers the microphone and requests the voiceprint. The voiceprint is loaded into RAM and the system requests the user to speak.

The voice is compared. On False the application terminates power. On positive the application loads the credential application.

The application selects the interface for credential distribution and applies power to each circuit.

The sensor is transformed to a selector and the microphone is transformed into a selector by the application.

Selected applications run until the user of the application terminates power.

2 Remote signals activate the passive RFID and it transmits the unique RFID.

A separate challenge is required to the user to prove credential ownership.

3 A page is sent to the card on standby power.

A firmware application updates the credential against a preassigned code.

4 Multi app to follow.

Figure 9:
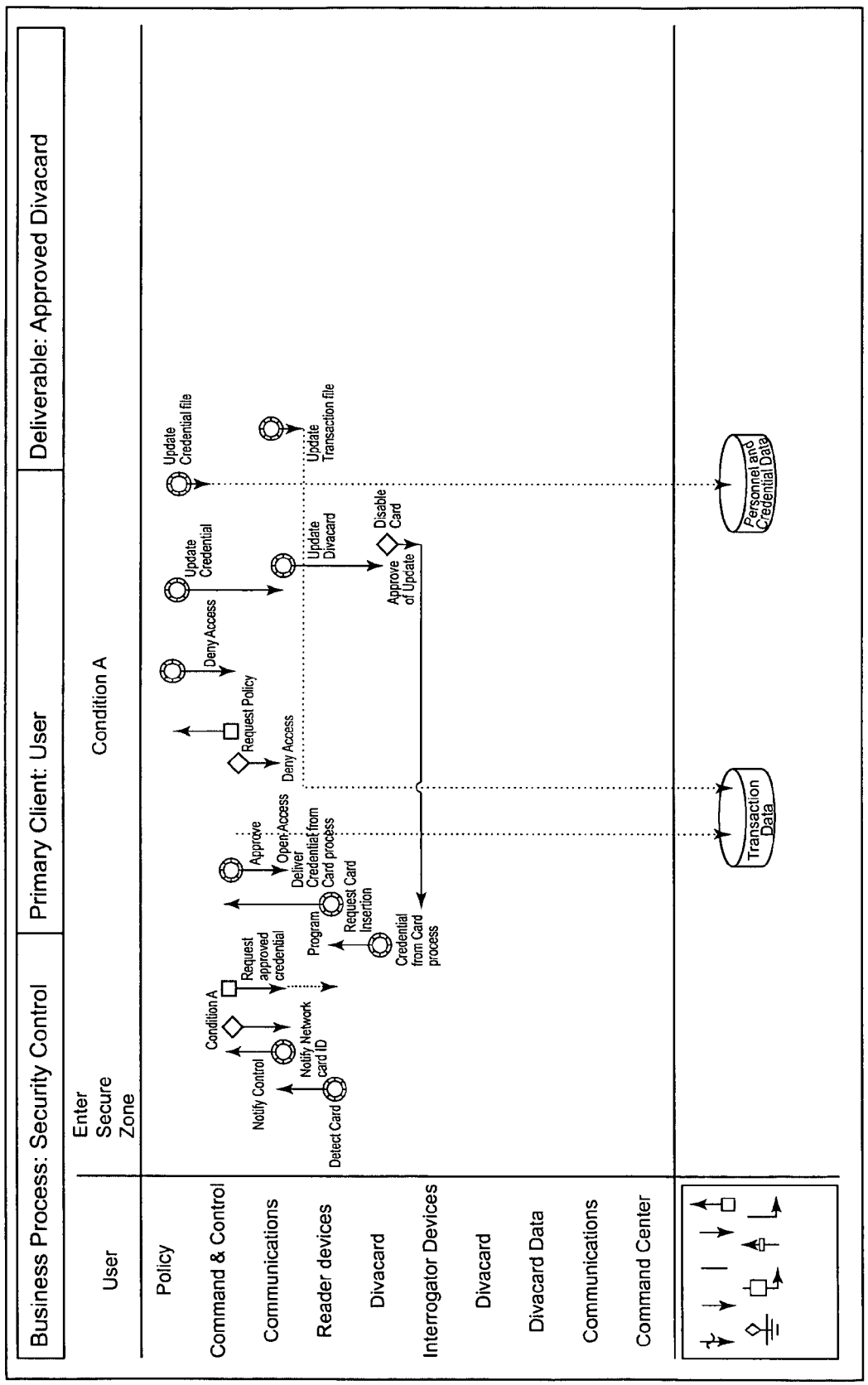
FIG. 9 is a flowchart of the security control method of the present invention.

Please reference FIG. 9.

Scenario

A user enters a secure zone.

The card detector identifies the card ID number.

The detector communicates with the Command Center.

If the card is not approved then access is denied and condition A is implemented.

If the card ID is approved, the user is requested to send the credential by matching their fingerprint to the card and releasing the appropriate security data.

The command system allows access.

Condition A

The command center checks policy.

If the card holder has no updating authority then access is denied.

If access is denied the policy engine can enforce the shut down of the card, disabling it from further use.

If the card can be updated the updated credential is sent through the communications network and the card is updated.

The user represents the credential.

The transaction and credential databases are updated.

Figure 1:
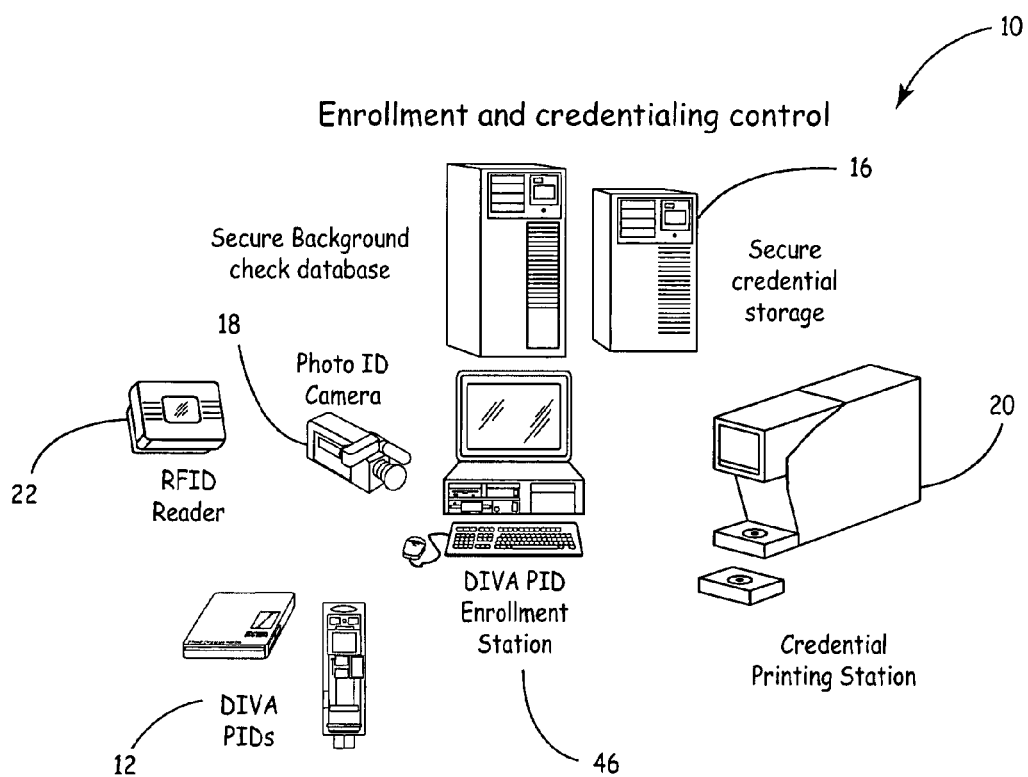
FIG. 1 is a schematic of the enrollment system of the present invention.

The form factors for the DIVA-PID 12 come in three general configurations, a credit card like format, a key fob like format, and a pager like format. Numerous variations of these configurations are possible. The enrollment station 14 is a series of integrated devices (see FIG. 1) and software that is configured into numerous configurations to suit the application. The DIVA-PID 12 and the enrollment station 14 comprise the elements of the credentialing authentication and management system.

The Enrollment and Credentialing Control Center

There are three functions to Enrollment and Credentialing Control:
DIVA-PID Enrollment Station 14
Security Control Equipment 16
Communications Process (not shown)
DIVA-PID Enrollment Station The station 14 is used to create and manage personnel access. It consists of biometric device interface modules to capture data, networked stations integrating the device with the Security Integration Engine, and a networked station to create and control personnel enrollment and authorization records.

Specifically, the DIVA-PID Enrollment Station 14 is used to:
Create authorized personnel records.
Capture fingerprint records (if desired or mandated by underlying policy).
Run background checks with appropriate authorities to verify status of personnel (if desired or mandated by underlying policy).
Program DIVA-PID 12 access devices.
Grant authorizations based upon the unique profile of the holder.
Print and secure DIVA-PID 12 devices and issue each device to an Authenticated individual.
Security Control Equipment The SCS 16 is used to monitor the status of an access control application and make necessary interventions. The SCS 16 can also be used to modify the general security protocols being used by the system, or the specific protocols being used by sensors.

Specifically, the SCS 16 can be used to:
Track the location of authorized personnel throughout the control area.
Monitor the alert status of the DIVA-PID 12 and track the location of unauthorized entries in the control area.
Communications Process The communications methodology integrates compatible wireless and non-wireless devices and enables access control to authorized devices only. The communications process consists of a networked station that integrates secure wireless and non-wireless voice communication devices.

Specifically, the communications process is used to:
Manage communications with security personnel from the security office, including the transmission of security protocols and changes to alert status.
Control and/or limit access to the communications network.
Update, add, or remove credential information.
Typical Enrollment Process (FIG. 8)

DIVA-PID 12 blanks are delivered to enrollment centers for personalization to the end user, and to have all the appropriate codes, tokens, and credentials added (see FIG. 8). Prior to issuing a DIVA-PID 12, the enrollment officer will follow the established policy for card issuance. A policy will typically involve a background check and a verification of credentials and/or access privileges. The enrollment officer and the policy mechanisms are responsible for verifying that the applicant has been positively identified prior to proceeding. Depending upon the underlying policy, the user will enroll a single finger, or a combination of digits. The ability to enroll multiple digits means that more than one individual can be enrolled to a single card. The DIVA-PID 12 can be set up to activate when it positively identifies any one of the digits now stored in memory or a combination of digits in a specific order to act as additional security. A certain pattern of fingers could be assigned to covertly indicate that a user was under duress when authenticating.

Once the enrollment process is completed the enrollment circuitry is disabled by electronic means so that only the enrollment office can enroll or re-enroll a user. If the policy allowed, the DIVA-PID 12 could be set up to allow the addition or removal of credentials through the RFID. At the time of enrollment:

DIVA-PID 12 can employ encryption and digitally secure transfer mechanisms.

The DIVA-PID 12 can be used for every secure card need from access control to credit card protection.

Each DIVA-PID 12 has the ability to store multiple credentials, such as a drivers license, passport, building access, credit card, health care card, etc.

Unless authenticated, the DIVA-PID 12 remains in the "deep sleep" default mode, but can be "seen" once the DIVA-PID 12 is within the read range of the RFID network. This is due to DIVA-PID 12's on-board RFID being in the semi-active RFID mode while the card is in deep sleep. Only when the DIVA-PID 12 is turned on by an authenticated holder can the card functions be activated.

Enrollment Center Equipment Description
Enrollment Center Digital Camera

A digital camera 18 is connected to the Enrollment Station computer to capture the owner's photograph, which is taken by the enrollment officer. A typical camera for this purpose is a Polaroid model SX-2, photo ID camera.

Enrollment Center Printer

A card printer 20 is used to print return address if lost information or a photo ID if an active display configuration was not selected. A typical ID card printer is a Fargo CardJet 410 Photo Id System.

Enrollment Center Enrollment Station

The enrollment station 14 is preferably a personal computer running access control software from Galaxy Controls model/system 602. This system captures the personal credential information transferred from the background check database and stores the information in the secure credential storage database. The digital picture is attached electronically to the stored credential to complete the data portion of the enrollment process.

The personal computer is preferably a standard windows 2000 operating system compliant desktop from any commercial source such as a Dell Dimension™ 4600 or equivalent.

Enrollment Center RFID Reader

The RFID reader 22 is a 802.15.4 transceiver device that detects the presence of a DIVA-PID 12 from up to 300 feet away depending on obstructions or the specific frequency selected. The reader will interface back to the enrollment station computer 14 to validate the device-holder's credential once the device-holder authenticates the DIVA-PID 12. The reader is equivalent to the DIVAcard configuration except it does not include the optional functions like the LEDs, tone generator, LCD, Display, smart chip, or magnetic stripe emulator. The reader can interface back to the enrollment station over a wired or wireless connection as desired in the application. The reader is preferably compatible with the Chipcon CC2420DK Development Kit.

Enrollment Center Secure Background Check Database

A secure server 24 is used to store, search, and retrieve background information on enrolled users. A common SQL complaint database with windows 2000 server or equivalent is preferably used for the data structure. The server is preferably compatible with a Dell PowerEdge™ 700 series server.

Enrollment Center Secure Credential Storage

A secure credential storage server 26 is used to store, search, and retrieve credential information on enrolled users from the enrollment station and the secure background database. A common SQL complaint database with windows 2000 server or equivalent is preferably used for the data structure. The server is preferably compatible with a Dell PowerEdge™ 700 series server.

Enrollment Center DIVA-PID Blanks

DIVA-PID 12s, available in all three configurations are delivered to authorized enrollment centers to be matched to users and activated.

DIVA-PID 12 Typical Form Factors (a) The Credit Card like configuration

The DIVAcard 12 format 12a is generally designed to have a form factor (see FIGS. 2a, 2b and 3) that conforms with the physical requirements of standard magnetic strip cards and smart cards, as specified in International Standards Organization ("ISO") standards ISO 7811 and ISO 7816 with the exception of flexibility and that the thickness will likely range from 0.78 to 5.0 millimeters depending on the application and features.

The invention 10 includes a biometric sensor 30 coupled with control circuitry (not shown), microprocessor 32, memory 34 and an on-board power source 36. An alphanumeric display 38, tone generator 40, and LEDs 42 are provided for interacting with the user. A visual display area 44 with either an active display or a printable area is provided with multiple means of securely interacting with the user and with existing infrastructure, including: a magnetic stripe emulator 45 for interacting with magnetic stripe readers in ATMs or POS devices; a smart card contact pad 46 in the 0.78 mm thick configuration; and an embedded antenna 48 for interacting with a number of electromagnetic devices, including contact-less smart card readers, SMS, GPS, and radio frequency identification devices (RFIDs). The alphanumeric display 38 is also capable of interacting with infrared bar code scanners by displaying a bar code similar to a Universal Product Code used on most consumer goods or of the type used to identify a customer's loyalty or member account number, such as those used at a retail store. The on-board power source may include a rechargeable battery, a non-rechargeable battery, or some combination of these devices. For an exploded view of the layers making up the core functions of the DIVAcard, see FIG. 4.

Figure 3:
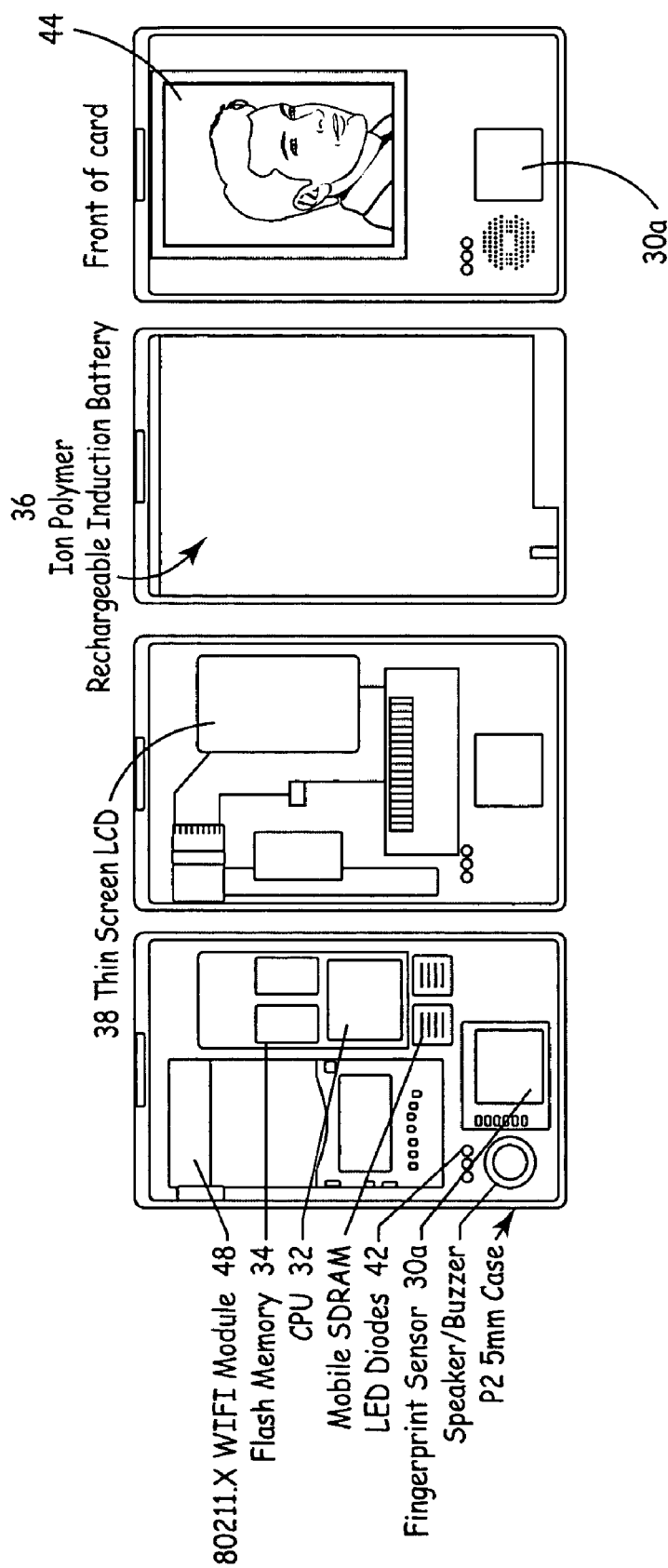
FIG. 3 is a schematic of various elements of the device of the present invention.
Figure 4:
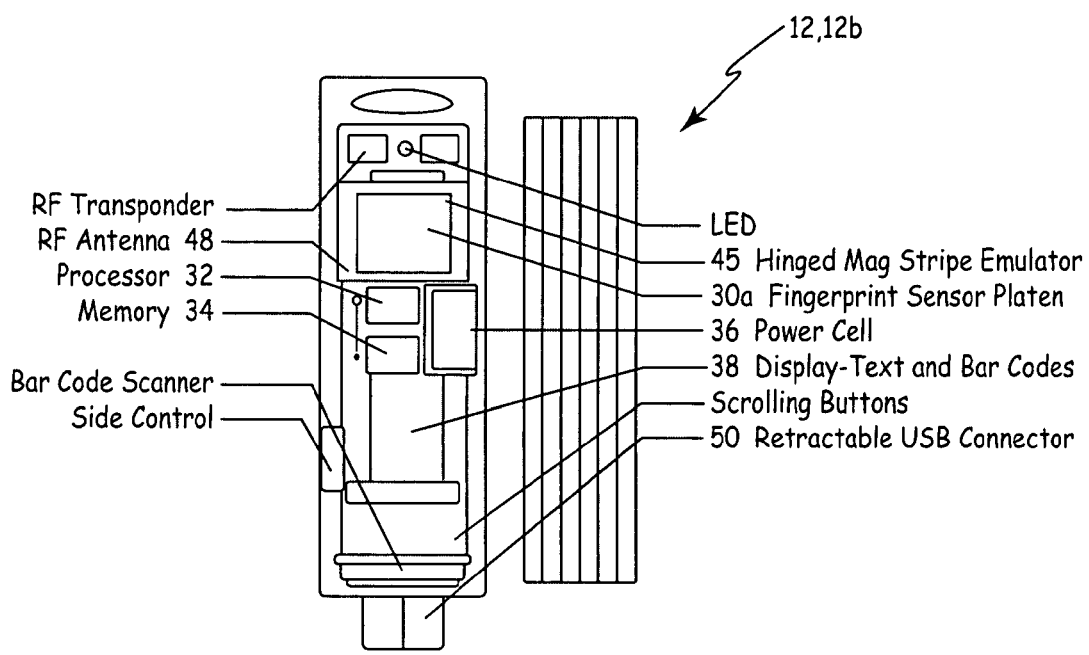
FIG. 4 is a plan view of a second embodiment of the present invention having a form factor similar to a key fob.
Figure 5:
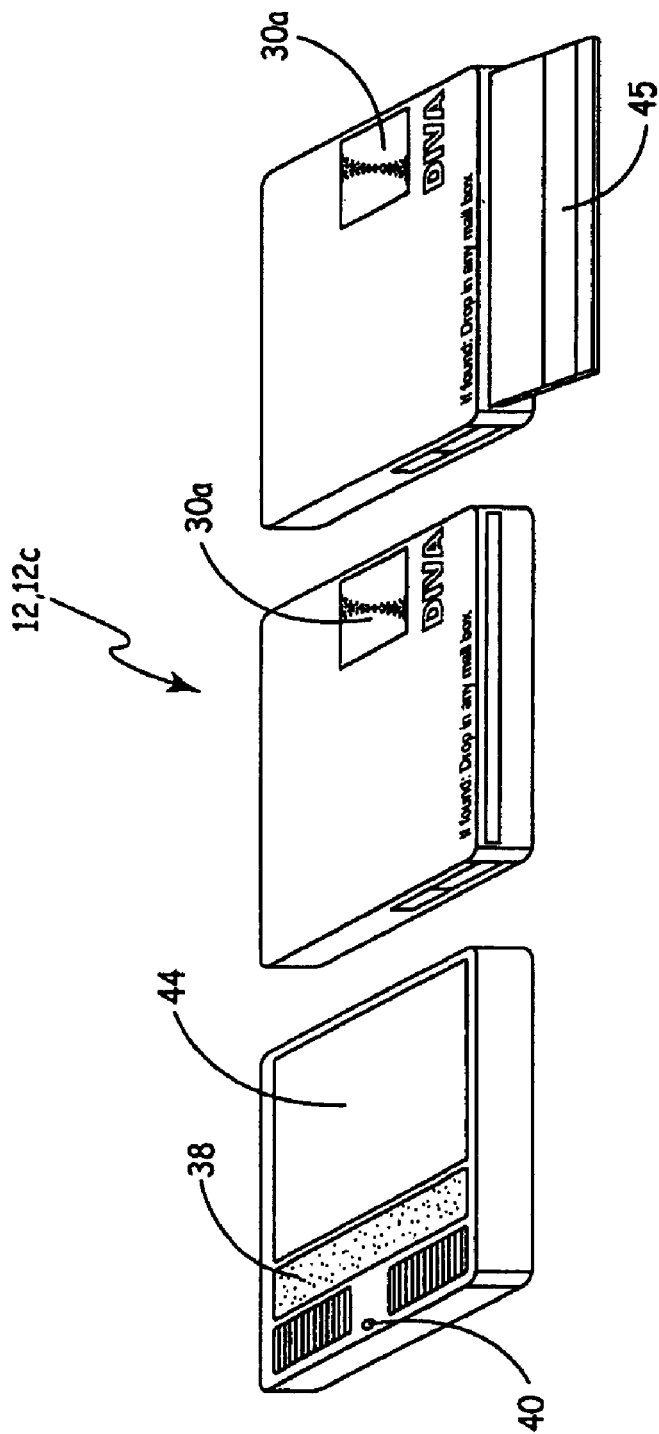
FIGS. 5a-5c are perspective views of a third embodiment of the present invention having a form factor similar to a pager.

(b) The Key Fob Like Configuration (FIGS. 3 and 4)

The DIVAkey Fob 12, 12b includes the following components: a biometric sensor 30 coupled with control circuitry (not shown) and memory 34, an on-board power source 36, a means of interacting with the user, such as an alphanumeric display device 38, and various means of securely interacting with existing infrastructure, such as through a magnetic stripe emulator 45 for interacting with magnetic stripe readers in ATMs or POS devices, an antenna 48 for interacting with any of a number of electromagnetic device terminals, such as contact-less smart card readers or other radio frequency devices.

In one variation a Universal Serial Bus (USB) plug 50 is included for interaction with a USB port of a typical personal computer. The power source 36 includes a rechargeable battery, a non-rechargeable battery, or some combination of these power sources. In one variation, the display 38 is capable of interacting with bar code scanners, such as standard infrared bar code scanners used at the checkout lanes of retail stores by displaying a bar code similar to a Universal Product Code used on most consumer goods or of the type used to identify a customer's loyalty or member account number, such as those used at a retail store.

In this form factor, the magnetic stripe emulator 45 does not work in so-called capture magnetic stripe readers of the type found in ATMs and gas pumps, but does work in most swipe-style POS terminals where the magnetic stripe is swiped through a slot that contains the magnetic stripe read head.

(c) The Pager Like Configuration (FIGS. 3, 5a, 5b, 5c)

The DIVApager 12, 12c includes the following components: a biometric sensor 30 coupled with control circuitry (not shown) and memory 34, an on-board power source 36, a means of interacting with the user, such as an alphanumeric display 38 and a visual display area 44, and various means of securely interacting with existing infrastructure, such as through a magnetic stripe emulator 45 for interacting with magnetic stripe readers in ATMs or POS devices, an antenna 48 for interacting with any of a number of electromagnetic device terminals, such as contact-less smart card readers or other radio frequency devices.

In one variation (not shown) a Universal Serial Bus (USB) plug is included for interaction with a USB port of a typical personal computer. The power source 36 is a standard cell phone rechargeable battery. In one variation, the display 38 is capable of interacting with bar code scanners, such as standard infrared bar code scanners used at the checkout lanes of retail stores, by displaying a bar code similar to a Universal Product Code used on most consumer goods or of the type used to identify a customer's loyalty or member account number, such as those used at a retail store.

In one variation (not shown), an audio tone generator and LEDs are included to assist in the interaction with the user.

In this DIVApager form factor, the magnetic stripe emulator 45 flips out from the side of the case and does not work in so-called capture magnetic stripe readers of the type found in ATMs and gas pumps, but does work in most swipe-style POS terminals where the magnetic stripe is swiped through a slot that contains the magnetic stripe read head.

Figure 6:
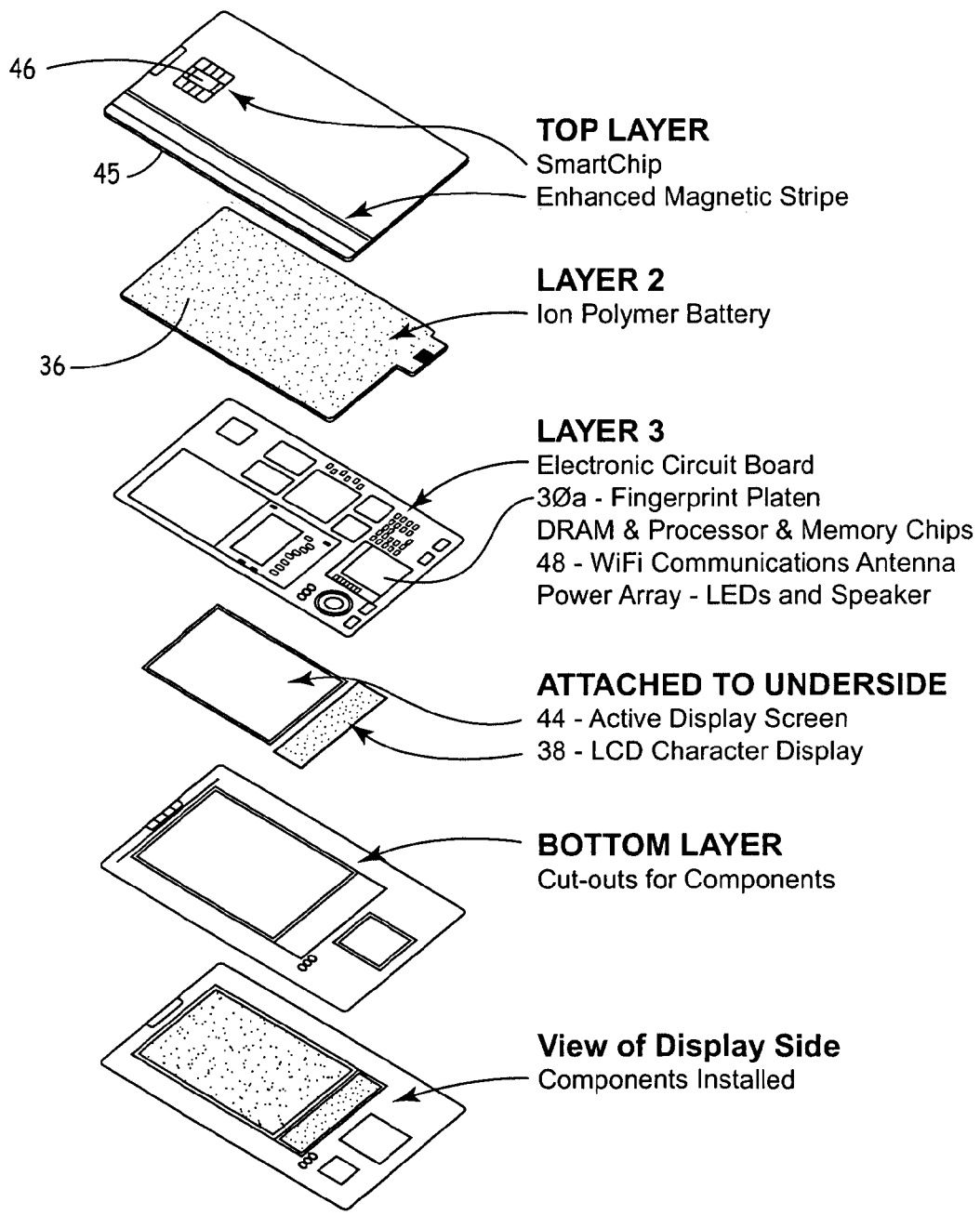
FIG. 6 is an exploded perspective view of the layers of the device of the present invention.

The DIVA-PID Manufacturing Approach (FIG. 6)

The core functionality integrated by the DIVA-PID 12 device utilizes a unique manufacturing process developed for the pressure sensitive materials industry to build up printed layers of functional devices at high machine speed feeds (see FIG. 10) utilizing flexible glass, glass epoxy or polyimide substrates.

Pressure Sensitive Adhesive Layers Using Flexible Substrates

The core functions are partitioned on up to three layers of adhesive material that are combined to form a single flexible assembly for the DIVAcard and the DIVApager formats. The preferred substrate material is a thin woven fiberglass sheet that is vacuum impregnated with a solvent-less resin technology. This material is very stable thermally and mechanically with excellent dielectric properties. The individual layers can be applied to a roller and configured in a machine to be rolled out with the other layers to make the finished assembly. An adhesive is applied during the process to permanently bind the layers.

The DIVAkey will use the same manufacturing technique but will have different layers to fit into the irregular case.

SmartCard Contact/Contactless Chip

The DIVA-PID 12 may include a contact-less SmartCard device and can interact with standard SmartCard readers of the type that are typically connected to merchant terminals and standard computers, as described in the ISO 7816 specification such as a Datakey Model 330. The DIVAcard also has a SmartCard contact terminal pad 46. There are a number of interactions for which standard smart cards are used, including building access, computer access, network access, electronic financial purses, long distance telephone calls at pay phones, mobile phone network access and mobile phone account numbers or purses. The interaction begins with a personalized DIVA-PID 12 with at least one previously initialized credit or debit account number. The fingerprint template of the authorized user and the initialized account numbers are stored in the non-volatile memory of the device. The process includes three principle steps: enabling the device, selecting an account, and enabling the SmartChip.

Magnetic Stripe Emulation

The DIVA-PID magnetic stripe emulation processes include an account initialization process and an emulation process at an ATM or at the point of sale. The magnetic stripe of common identification cards are specified by the American National Standards Institute (ANSI), such as in ANSI standard X4.16-1983, and by the more recent international standard for identification cards provided in ANSI/ISO/IEC-7811 Parts 1-5. The typical process for any of the devices described herein with a magnetic stripe emulator is the use of the magnetic stripe emulation at a POS terminal or, at an ATM for the purpose of transmitting to the magnetic stripe reader a credit or debit account number. The magnetic strip is part of the internal circuit of the Divacard and operates only after the user authenticates himself/herself to the device. In addition, the function of the card allows multiple accounts to be accessed via the conversion of the fingerprint sensor into a track pad.

The interaction begins with a personalized device with at least one previously initialized credit or debit account number. The fingerprint template of the authorized user and the initialized account numbers are stored in the non-volatile memory of the device. The process includes three principle steps: enabling the device, selecting an account, and emulation of the magnetic stripe.

Magnetic stripe emulators are generally known. See, for example, U.S. Pat. No. 6,206,293, No. 5,834,747, and No. 4,791,283. Our invention does not attempt to reproduce the entire magnetic stripe but instead electronically couples a portion of the needed code written on the magnetic stripe track at the enrollment process. In this manner the power requirements are minimal and the magnetic stripe is unreadable until turned on by the authenticated device holder.

Biometric Control System

The invention 10 can incorporate fingerprint sensor technologies 30a of three available types, pressure, optical, and ultrasonic. It currently focuses on the pressure type from Fidelica Corp. primarily due to size, cost and the ease of manufacture on thin film materials. In addition, the pressure type sensor 30a can be used as a selector switch thus eliminating the need for additional devices. The fingerprint sensor 30a acts as an intelligent on-off switch for all function incorporated into the DIVA-PID 12. During the enrollment process, the owner of the DIVA-PID 12 may enroll any finger or thumb and multiple additional digits to activate the device. For more secure applications the enrollment process can require a number of fingers to be entered in a specific order, thereby making it more difficult to counterfeit. Once the fingerprint enrollment process is completed, the templates are stored in memory and the enrollment process is electronically permanently destroyed so no tampering with the authentication process can occur. The software algorithm used to match the results has a "single touch" false acceptance rate (FAR) of 0.001% and false rejection rate (FRR) of 0.08%, and is based on the leading forensic fingerprint algorithm developed by BioScrypt.

The interaction begins with the fingerprint template(s) of the authorized user that is stored in the non-volatile memory of the device by the authorized enrollment officer. The process includes four principle configurations: unauthenticated, authenticated, failed authentication, and authenticated "under duress."

RFID System

The RFID antennas 48 and chips support operating frequencies from 800 MHz to 2.45 GHz and are of the transceiver type operating in semi-active and active modes. The initial configurations utilize IEEE 802.15.4/Zigbee protocols in a Chipcon cc2420 (see FIG. 14). Once the biometric sensor 30 is activated by the authorized user, the RFID circuit can be selected to operate in the active mode. The semi-active mode allows the device to be detected by vicinity and proximity readers to alert the reader that the device is within a control area, but has not yet been authenticated to pass sensitive credential information. This feature is important in access control applications as a detection and tracking tool. The read/write capability allows credentials to be electronically updated, added, or removed by authorized enrollment agents.

The interaction begins with a personalized device with at least one stored credential. The fingerprint template of the authorized user and the active and semi-active credentials are stored in the non-volatile memory of the device. The device, even in "deep sleep" mode, is always in the semi-active mode so it can detect or be detected by a RF reader. Once the device is detected, the reader can activate the device's tone generator 40 or LED 42 to indicate that the user should attempt to authenticate the device. Once authenticated, one or more credentials are transmitted, or other functions on the card are activated to interact with the reader.

Barcode

The bar codes displayed by the devices described herein are dynamically rendered on the alphanumeric display 38 that can be read by standard bar code scanners. Further, the user is able to select from a number of bar codes stored in the device. Further, the display device can be directed to remove the image of the bar code from the display so that the bar code cannot be scanned until the user again selects the bar code to be displayed and potentially re-verifies his identity through biometric input. This invention 10 can be used to display membership account numbers of the type used by retail and grocery stores, as well as membership numbers used by membership clubs, such as country clubs and fitness clubs.

The interaction begins with a personalized device with at least one stored credential. The fingerprint template of the authorized user and the bar code information is stored in the non-volatile memory of the device. Once the user authenticates the card the finger platen 30a can be used as a mouse to index through the functions displayed on the LCD until the Bar code function is selected. The bar code can then be scanned.

Alphanumeric Display

The Basic Display card includes all of the devices listed in the Secure Multi-access Display card, with a small display 38 that displays alphanumeric text, graphics, and bar codes. The small display uses 1 to 2 lines and up to 20 characters. A special film material is applied over the display in manufacturing to allow the LCD or other display type to emulate bar codes readable by standard bar code scanners.

The interaction begins with a personalized device with at least one stored credential.

The fingerprint template of the authorized user is stored in the non-volatile memory of the device. Once the user authenticates the card, the finger platen 30a can be used to index through the functions displayed on the LCD or other display type until the desired function is selected and becomes active for a predetermined period of time.

Active Display

An optional configuration provides for an active display 44 that has sufficient resolution to produce tables of information and graphical images. Information can be stored in memory or dynamically written to the card through the RF interface. Once the image is written there is no need to keep power applied to the display to retain the image, thereby saving battery power.

In one use of this display, a table includes immigration and visa information of the authorized user. In another use, the display shows information typically found on a driver's license. However, the device is not limited to storing a single display as the biometric sensor pad permits input from the user that includes the ability of selecting and displaying multiple pages of information.

By way of example, a single device could store and display data for various purposes, such as passport control, driver's license information, border control authorization, building and computer network access control, financial account and balance information, credit/debit card authorization, and healthcare information.

Control Electronics and Operational Software

The control electronics tie all functions of the card together and control their operation including power management and battery charging. Application Specific Integrated Circuits and discrete devices are used in conjunction with memory devices, operational software, and encryption techniques to complete the total control of the DIVA-PID configurations.

No function can be executed unless first enabled by a successful fingerprint match except for the limited information available in the RFID semi-active mode.

Power Generation

Power generation is achieved by a combination of traditional thin-film deposition technologies and high energy density such as lithium polymer to create rechargeable battery technology that is integrated directly into the thin film layers of the functional elements being manufactured. The DIVAkey 12b and DIVApager 12c will use standard battery technology for electronic devices because more space is available. The battery is used in a pulsed mode to maximize the time between charges.

Short Messaging Service

The optional SMS Circuitry (not shown) can send and receive messages using the same deployed infrastructure as is used by existing two-way pagers.

The interaction begins with a personalized device with at least one stored credential. The fingerprint template of the authorized user is stored in the non-volatile memory of the device. Once the DIVA-PID 12 comes within range of a reader, the reader can send the user a signal to authenticate in order to receive a message. Once the user authenticates the card, the finger platen can be used to index through the functions displayed on the LCD until the desired SMS function is selected and becomes active for a predetermined period of time.

Global Positioning System

The optional GPS receiving circuitry (not shown) can be queried by the microprocessor to determine the global position of the device.

The interaction begins with a personalized device with at least one stored credential. The fingerprint template of the authorized user is stored in the non-volatile memory of the device. The DIVA-PID 12 can be set up to transmit a periodic GPS protocol format to a reader or it can be queried by an RF reader and the user can determine if they want to transmit a signal to identify their location.

Manner and Process of Using the Invention

The DIVA-PIDs fingerprint platen 30a is activated upon touch, which switches on the electronics and initiates a comparison of the current fingerprint(s) with the onboard fingerprint(s). If the print matches one of the stored prints or the correct pattern of stored prints, then the card is enabled; if not, it shuts down so that no data can be transmitted by the device. Once activated, the platen 30a can be used as a select/scroll touch sensitive control pad.

Because the card will be handed to third parties (e.g., a merchant) for many of the transactions, a timer can be programmed to keep the card open for a fixed period (e.g., fifteen seconds to two minutes) so that the card can go through its authorization and update processes. After the time expires, the card shuts down until biometrically activated again.

Expiration dates can be set to shut down the card at a fixed time. The card can be addressed by authorized enrollment agents to remotely remove or update credential data. The card has a variety of optional ways of interacting with the infrastructure. Magnetic Stripe Emulation interacts with standard magnetic stripe readers. A SmartCard contact pad is used to interact with SmartCard contact readers. An antenna provides interactions with contact-less read/write devices and may interact with common transponder technology such as EZ-Pass and SpeedPass.

In addition, card queries and detection can be managed from distances of up to 300 feet, depending on power and data transmission speed requirements.

A significant advantage of the DIVA-PID 12, in addition to biometric security, is the magnetic stripe emulation capability that allows current magnetic stripe readers, the least expensive and most ubiquitous credit card reading devices, to interact with the DIVA-PID 12. Most credit card and access control infrastructure is based on magnetic stripe readers.

The inventors have developed a method for sending a signal to the magnetic stripe area 45 of the card to "unlock" the magnetic card stripe. The major difference is that, unlike current magnetic stripe technology, the magnetic stripe cannot be read unless the device is switched on by the authenticated holder. This greatly enhances the security of this most basic technology.

Another security risk, the embossed number, can be overcome by replacing the embossed number with a digital display that is only activated by the verified user. As a by-product of this function, multiple card accounts, reward programs, coupons, access rules, credentials, special applications and other digital real estate can be viewed and used. Notwithstanding brand and issuer rules, a single card could contain issuing bank account information, as well as account numbers for VISA, MasterCard, American Express, or any other desired debit/credit payment system.

(d) Typical Operational Modes

1. RFID credential pass
   a. The user receives a yellow LED and a single tone to indicate they are within range of a reader.
   b. The user activates the card 12 by placing the correct finger(s) on the platen 30a. Once the scan is complete a single audible tone occurs and the LCD 44 is activated to allow the user to scroll to select the desired function.
   c. The user scrolls to the Active RFID function using the platen 30a then "double presses the platen" to execute the Active RFID function and the credential is transmitted (X) times per second for (X) seconds.
   d. Once the Active RFID function has been activated, a timer is started for a total of (X) seconds, then the Active RFID is disabled.
   e. An audible tone is sounded once at the beginning of the transmittal and twice at the end of the time out period.
   f. The user can select another function through the LCD 44, or do nothing and the card 12 will shut off in (X) seconds/minute(s). Once the time out period has completed the card 12 will deactivate, which will be noted by two audible tones.
2. Active display data
   a. The user activates the card 12 by placing the correct finger(s) on the platen 30a. Once the scan is complete a single audible tone occurs and the LCD is activated to allow the user to scroll to select the desired function.
   b. The user scrolls to the Visual data function using the platen 30a then "double presses the platen" to execute the Visual data function.
   c. Once the Visual display function has been activated the display image remains until wiped clean or replaced by the next transaction.
   d. The user can select another function through the LCD 44, or do nothing and the card 12 will shut off in (x) seconds/minute(s). Once the time out period has passed, the card 12 will deactivate, which will be noted by two audible tones.
3. LCD data display
   a. The user activates the card 12 by placing the correct finger(s) on the platen 30a. Once the scan is complete a single audible tone occurs and the LCD 44 is activated to allow the user to scroll to select the desired function.
   b. The platen 30a can be depressed once to scroll through functions or lines of Alpha-numeric data as desired. Once the platen ceases to be depressed for (x) seconds and audible tone is sounded to alert the user the card will shut off in (x) seconds/minute(s).
   c. If the platen 30a is depressed during the time out period the time out period will restart. Once the time out period has completed the card will deactivate, which will be noted by two audible tones.
4. Smart Card operational
   a. The user activates the card 12 by placing the correct finger(s) on the platen 30a. Once the scan is complete, a single audible tone occurs and the LCD 44 is activated to allow the user to scroll to select the desired function.
   b. The user scrolls to the Smart Card function using the platen 30a then "double presses the platen" to execute the Smart Card function and the token is transmitted (X) times per second for (X) seconds.
   c. Once the Smart Card function has been activated, a timer is started for a total of 10 seconds then the Smart Card function is disabled.
   d. An audible tone is sounded once at the beginning of the transmittal and twice at the end of the time out period.
   e. The user can select another function through the LCD 44, or do nothing and the card 12 will shut off in (x) minute(s).
   f. Once the time out period has completed the card 12 will deactivate, which will be noted by two audible tones.
5. Magnetic Stripe operational
   a. The user activates the card 12 by placing the correct finger(s) on the platen 30a. Once the scan is complete a single audible tone occurs and the LCD 44 is activated to allow the user to scroll to select the desired function.
   b. The user scrolls to the Magnetic Stripe function using the platen 30a then "double presses the platen" to execute the Magnetic Stripe function.
   c. Once the Magnetic Stripe function had been activated, a single tone is heard and the magnetic stripe emulation circuit is energized complete the Magnetic Stripe information and a timer is started for a total of 30 seconds, then the magnetic stripe emulation circuit turned off and the function is disabled with a double tone executed.
   d. The user can select another function through the LCD 44, or do nothing and the card 12 will shut off in one minute. Once the time out period has completed the card 12 will deactivate, which will be noted by two audible tones.
6. Bar code operational
   a. The user activates the card 12 by placing the correct finger(s) on the platen 30a. Once the scan is complete a single audible tone occurs and the LCD 44 is activated to allow the user to scroll to select the desired function.
   b. The user scrolls to the bar code function using the platen 30a then "double presses the platen" to execute the bar code function.
   c. Once the bar code function had been activated, a single tone is heard and the LCD emulation circuit is energized to display the bar code information and a timer is started for a total of (x) seconds, then the bar code LCD circuit is turned off and the function is disabled with a double tone executed.
   d. The user can select another function through the LCD 44, or do nothing and the card 12 will shut off in (x) minute(s). Once the time out period has completed the card 12 will deactivate, which will be noted by two audible tones.
7. SMS and GPS messaging
   a. The user receives a yellow LED and a single tone to indicate they are within range of a reader that is SMS and GPS enabled.
   b. The user activates the card 12 by placing the correct finger(s) on the platen 30a. Once the scan is complete, a single audible tone occurs and the LCD 44 is activated to allow the user to scroll to select the desired function.
   c. The user scrolls to the SMS or GPS function using the platen 30a then "double presses the platen" to execute the SMS or GPS function and the credential is transmitted (X) times per second for (X) seconds.
   d. Once the SMS or GPS function has been activated the message is sent or received and a timer is started for a total of (X) seconds then the SMS or GPS is disabled. The GPS can be programmed to periodically transmit if tracking is desired.
   e. An audible tone is sounded once at the beginning of the transmittal and twice at the end of the time out period.
   f. The user can select another function through the LCD 44, or do nothing and the card 12 will shut off in (X) minute(s). Once the time out period has completed the card 12 will deactivate, which will be noted by two audible tones.

Personalization Process

Before any of the DIVA-PID 12 devices described herein can be used to conduct transactions on behalf of a particular user, the device must be personalized to the owner. For example, the owner must register his fingerprint with the device through the biometric fingerprint platen 30a. After the personalization step, that individual becomes the authorized user of a particular device. For the devices with a display 44, the authorization process can be facilitated through graphical prompts in the display. For secure credentials, the enrollment and credentialing systems must be used. However there are numerous applications where the owner can download information from the Internet directly onto the DIVA-PID 12 through the smart chip pad and a PCMCIA card without the need for the enrollment system 14. For example, coupons, specials, or loyalty programs a company may wish to offer DIVA-PID owners.

Initialization Process

Once a DIVA-PID 12 has been personalized, it may be initialized with data, such as account information related to a particular credit account through the enrollment and credential management system.

The basic steps in the remote initialization process are:

Enabling the device by an authorized owner

Establishing a secure connection to an authorized initializing institution so that particular information can be downloaded to the biometric device Verifying the right of the user to access the sought after information, and downloading the information to the biometric device. Credentials can also be downloaded by authorized reader stations at various locations. See FIG. 8, which details the systems view of the initialization and management process.

Enabling Processes

8 Card Activation:

Scenario:

1. A user activates the card, pressing on the finger sensor and activates the power; the initial application is loaded and the fingerprint is delivered to RAM for comparison.

The application loads the template from stored memory, and, if the template is successful, then the secondary application is requested and loaded. On false, the application terminates power in Bimodal Mode; the application powers the microphone and requests the voiceprint. The voiceprint is loaded into RAM, and the system requests the user to speak.

The voice is compared on False; the application terminates power.

On positive, the application loads the credential application.

The application selects the interface for credential distribution and applies power to each circuit.

Then sensor is transformed to a selector, and the microphone is transformed to a selector by the application.

Selected applications run until the user or the application terminates power.

2. Remote signals activate the passive RFID, and it transmits its unique RFID.

A separate challenge is required for the user to prove credential ownership.

3. A page is sent to the card on standby power.

A firmware application updates the credential against a preassigned code.

4. Multi-app to follow.

7 Card Enrollment:

Scenario:

Policymakers determine access control rules and credential authority.

Security authority sets the technology levels required to allow policy, timers, power management, encryption, applications to be run, order of processes, communication channels, communication frequencies, update policies, command center controls, transaction logging, panic modes, display data.

These are programmed into the enrollment work station.

During enrollment, the enrollment station requests the insertion of a blank Divacard. The card is tested to detect any interface flaws. If it is flawed, the transaction is terminated and a new card inserted. The system acknowledges the status on the work station screen.

The policy and applications that drive the card processes are loaded onto the Divacard and stored in memory.

The enrollment application requests the personnel data from the database.

The data and the credentials associated with the individual and policy are loaded onto the Divacard.

Divacard applications encrypt the data and application.

The Divacard requests a fingerprint to associate with the credential and personnel data.

The enrollment system passes on the request.

The user places their finger on the Divacard embedded fingerprint reader.

The Divacard runs its fingerprint algorithm and encrypts and stores that data on the card.

The enrollment station may optionally store the fingerprint on a database (policy driven).

The transaction is logged on the security transaction database.

The application is terminated.

9 Security Control:

Scenario:

A user enters a secure zone.

The card detector identifies the card ID number.

The detector communicates with the Command Center.

If the card is not approved, then access is denied and Condition A is implemented.

If the card ID is approved, the user is requested to send the credential by matching their fingerprint to the card and releasing the appropriate security data. The command system allows access.

Condition A:

The command center checks policy; if the cardholder has no updating authority, then access is denied.

If access is denied, the policy engine can enforce the shutdown of the card, disabling it from further use.

If the card can be updated, the updated credential is sent through the communications network, and the card is updated.

The user represents the credential.

The transaction and credential databases are updated.

Once a DIVA-PID 12 that has been initialized with the necessary information associated with the authorized user, the enabling process will verify that that individual is an authorized user of the device.

The enabling process must be successfully performed before the device will transmit any personal data to any outside device. The enabling process is the same for all of the biometric devices. Where the biometric device 30 includes a fingerprint sensor 30*a*, the biometric device 30 is enabled by the authorized user by the placement of the user's enrolled finger, or fingers in a series, on the fingerprint platen 30*a*. The fingerprint platen 30*a* recognizes the placement of the finger and begins the scan of the finger to determine the fingerprint, reducing the fingerprint to a template of minutiae as is common in the art. This minutiae template is compared with a previously stored fingerprint minutiae template and a calculation is made as to the degree of match between the two templates. If the match meets pre-established criteria, then the match is verified and the biometric device converts to an enabled state.

The enabling step takes less than two seconds.

Consistent with the concepts of the invention 10, sufficient power is included in the devices such that the enabling process can occur without the aid of any other device. This step is crucial to enabling the biometric device 30 to transact with other systems, such as a magnetic stripe reader, a contact or contact-less smart card reader, a radio frequency device, or a bar code scanner.

Consistent with the invention 10 herein, each device includes a display or an audio tone generator, or some combination thereof, which separately or together aid the authorized user of the device through the enabling process by providing prompts on the display or generating one or more tones or tone sequences, or some combination of these prompts and feedbacks. Once enabled, the device may stay enabled until, for example, a predetermined time period has elapsed or for a predetermined number of uses. Once the device is in an enabled state, the device is ready for the account selection step. For the devices described herein with active displays 44, the display may show the account number used during the last transaction, or some graphic or text that identifies the account number to the user such as either an institution name, credit organization name or icon.

The owner uses the finger platen 30a to index through the type of transaction he wishes to perform. If the account that the user wants to use for the given transaction is the same as the account used on the previous transaction, then this step is complete. Once the desired account has been selected, the user again places their finger on the fingerprint platen 30a to confirm the new account selection, ending the account selection step. Once the authorized user selects the desired account on an enabled device, the user either hands the DIVA-PID 12 to the store clerk for the clerk to swipe or insert in a magnetic stripe reader, or swipes/inserts the device himself.

Disabling Process

Consistent with the invention 10 described herein, select account information or all of the information on a secure device is subject to being removed by an authorized central service using SMS or a similar wireless messaging service. The disabling instructions are communicated in an encrypted manner by an authorized central service. The disabling instruction is called for when a user is no longer authorized to use a particular account or when the user reports the device as missing or stolen.

BEST MODE CONTEMPLATED FOR CARRYING OUT THE INVENTION

The business processes that are enabled by the integrated biometric devices are in the areas, among others, of financial transactions, information security transactions, physical access control, identification, device access control, loyalty program transactions, immigration and border control, travel identification, coupon solicitation and coupon redemption processes.

One of the novelties of the new invention is that information from interacting with one infrastructure, such as new account information obtained via a smart card reader connected to a personal computer, can subsequently be used during interactions with another infrastructure, such as making use of this new account information during a transaction with an ATM or POS terminal through the magnetic stripe emulation.

Immigration Process

In one variation of the DIVA-PID 12, some of the pages of information that can be displayed contain the same information that is on a standard passport, including type of passport, passport number, surname, given name, nationality, date and place of birth, sex, and date of issue of the passport, expiration date of the passport, authority, and image of the passport holder. In this variation, another page that can be selected contains information related to entering and leaving a country.

Driver's License Process

In one variation of the DIVA-PID 12 with the large display 44, some of the pages of information that can be displayed contains the same information that is on a state-issued driver's license, including licensing state, driver's license number, driver's name, current address, date of birth, sex, weight, height, eye color, an image of the driver, and additional information as required by the issuing state.

Travel Process

In one variation of the devices described herein, the device can be used during the travel process to validate that the user holding the device is the authorized user. This information can then be used to streamline the security clearance processes in place to screen passengers before they are authorized to board commercial transport, such as a ship, airline, bus or train.

Multi-Pass Process

There are several existing infrastructures presently deployed that make use of the ability to transmit an identification number over a radio frequency as a means of initiating a transaction with a subscribed patron. This radio frequency identification (RFID) process is used by drivers of vehicles to pay tolls at the tollbooths of toll roads and toll bridges, by drivers at gas pumps to pay for gasoline, and by patrons of convenience stores and restaurants to pay for goods and services. In the current art, each of the organizations that deploys RFID infrastructure for the purpose of accepting payment also gives to each of their customers that subscribe to the RFID payment service a physical token that responds with a preset RFID number.

Consistent with the invention 10 described herein, some variations of the DIVA-PID 12 devices can interact with one or more of these existing RFID payment infrastructures. After successfully initializing a device with one or more authorized subscriber RFID numbers, the authorized user of the device can enable the device, select the desired RFID account, and interact with the RFID payment infrastructure.

Coupon Selection Process

Consistent with the invention 10 described herein, some variations of the DIVA-PID 12's can interact with computer applications and with devices at a retail store where store-issued or manufacturer-issued coupons are accepted. The device can interact with a computer application to download electronic versions of coupons offered to the device user by the store, a manufacturer, or a third party organization acting on the behalf of the coupon issuing entity. The UPC code, codes, or code pattern for the product or products associated with the coupon offer and the amount of the discount are downloaded into non-volatile memory of the device.

In the variations of the devices that include the ability to interact through radio frequencies (RF capable devices), the devices can be activated at the entrances of participating retail stores and can provide an audible or visible prompt to the device user that coupons are available to that user for selection. In this variation, the user can then interact with the device to view the coupons that are being offered for products being carried by the retail store that has just been entered, and can select to accept one or more coupons for use in the near future. In one variation, the expiration time of the selected offers is selectable by the coupon issuer.

In some variation of the RF capable devices, the device can interact with an electronic coupon-dispensing device located on the store shelf near the product. When the user device is within a pre-selected distance (for example, ten feet or less), the shelf device can alert the shopper that a coupon is available for selection by flashing a light on the shelf unit and/or showing a prompt on a display attached to or part of the shelf unit.

In at least one variation, the shelf unit contains information on a default value of the coupon available for selection. In another variation, the shelf unit receives a value for the coupon from the user device. This step permits the coupon issuer the ability to offer a coupon to a device user that is different from the default value, with the specific user's coupon value having been previously selected during the coupon download process. In turn this personalized coupon value can then be displayed at the shelf unit for viewing by the device user.

Coupon Redemption Process

Consistent with the invention 10 described herein, the selected coupons are redeemed through a process at the checkout lane of the retail store. There is a device at the checkout lane that interacts with the user device, (the "Check-out Device") using any of the means supported by the user device. The Check-out Device also interacts with the store register. In the traditional process of coupon redemption, the shopper pays a discounted price and the store receives a printed coupon that it submits to the coupon issuer or a third-party coupon redemption aggregator for payment of the face value of the coupon plus a handling fee. In the process described here, however, the store receives full payment for the goods or services. The store register transmits the transaction log to the check-out Device. In one variation, the Check-out Device then obtains from the user device the selected coupons and transmits the transaction log, the selected coupons, and the user identification information to a central electronic coupon redemption service.

In an alternate variation, the Check-out Device transmits the transaction log to the user device and the user device transmits the transaction log, the selected coupons, and user identification information to a central coupon redemption service. In both variations, the transmission of the information to the central service may occur some time after the check-out process has concluded, such as during the night.

In the variation that the user device transmits the information, the user device uses the SMS network used by two-way pagers to transmit the information to the central service. In all variations, the store receives full payment for the goods or services purchased, including the products or services for which the user has selected coupons. The redeemed funds from the coupon issuer for the face value of the coupons plus handling or transaction fees are then credited to the user's account. In one variation some of the handling fee is shared with the store. In another variation, the store receives a transaction log transfer fee for any transaction log that includes at the least, one coupon redemption. At the time of purchase, the user device either calculates the total coupon savings that is earmarked to be credited to the user's account, or receives the total coupon savings amount from the central service via SMS messaging or similar wireless messaging service. After the coupons have been redeemed from the coupon issuer and the funds received by the central coupon redemption service, the appropriate earmarked funds are then credited to the user's account. On the devices with displays and wireless messaging service, the user can view the value of the coupon redemption account directly through the display on the secure device. These funds may be used directly through use of the device when the user selects the account to be used during a financial transaction, similar to the traditional use of a credit or debit card.

Transaction Log Processes

Consistent with the invention 10 described herein, the transaction logs obtained from the DIVA-PID 12 devices during the coupon redemption process are retained by a central service. The user can view their transaction logs and these logs are used as input into various algorithms that permits the user to examine their previous buying patterns and their use of coupons and coupon savings. Additionally, the transaction logs are used to assist in the preparation of a shopping list for the user.

In one variation of this process, the user selects coupons to be redeemed after successful transmission of the shopping list to a participating store and the store prepares the goods for pick-up or delivery.

Leveraged Technologies

The devices described above may integrate and use a number of available technologies, including:
- Fingerprint sensor available from Fidelica Corp or equivalent.
- Battery technology available from Solicore Corp or equivalent.
- Active display available from ZBD Displays Corp or equivalent.
- Pressure sensitive materials manufacturing available from MACtac Corp or equivalent.
- LDC displays, tone generators, standard electronic components, available from numerous commercial sources.
- Microprocessor and memory devices available from Atmel Corp or equivalent.
- IEEE 802.15.4/zigbee protocol chipsets available from Chipcon Corp or equivalent.
- Fingerprint matching algorithms available from BioScrypt Corp, Fidelica Corp or equivalent.
- SmartChip chipsets available from Datakey or equivalent.
- Flexible glass substrates available from Atholl Imagineers Co Ltd or equivalent.
- Photo ID cameras available from Polaroid such as model SX-2 photo ID camera or equivalent.
- Identification Card printers available from Fargo such as model CardJet 410 Photo Id System or equivalent.
- Enrollment station and software available from Galaxy Controls Corp such as model/system 602 or equivalent.
- Personal computer available from Dell such as Dimension™ 4600 or equivalent.
- RF Reader available from Chipcon Corp such as model CC2420DK Development Kit with modification or equivalent.
- Secure Background Check Database available from Dell PowerEdge™ 700 series server or equivalent.

Unless otherwise defined, all technical and scientific terms used herein have the same meaning as commonly understood by one of ordinary skill in the art to which this invention 10 belongs. Although methods and materials similar to or equivalent to those described herein can be used in the practice or testing of the present invention 10, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

The invention claimed is:

1. A portable, hand-held, programmable device for integrating and controlling multiple secure credentialing applications and for interacting with external systems, comprising:
   (a) a biometric sensor;
   (b) control circuitry;
   (c) a microprocessor;
   (d) a memory storing security policies, personnel data, biometric data, a credentialing application, operational software and a plurality of credentials, each of the plurality of credentials being associated with a security policy and personnel data;
   (e) a power source;
   (f) a plurality of distinct interfaces interacting with external credential-receiving systems;
   (g) the operational software executing on the microprocessor, implementing the security policies, and associating the biometric data with the credentialing application and the plurality of credentials;
   (h) the credentialing application executing on the microprocessor, requesting a credential from the memory based on input from the biometric sensor, selecting one of the plurality of distinct interfaces for credential distribution and presenting the credential to an external credential-receiving system through the selected one of the plurality of distinct interfaces; and
   (i) wherein the biometric sensor, the control circuitry, the microprocessor, the memory, the power source, the plurality of distinct interfaces interacting with external credential-receiving systems, and the operational software, and the credentialing application are integrated on the device.

2. The device of claim 1, further comprising a means for interacting with a user, the means for interacting with a user being integrated on the device.

3. The device of claim 2, wherein the means for interacting with a user further comprises an alphanumeric display, a tone generator, an LED, and a visual display.

4. The device of claim 1, wherein one of the plurality of distinct interfaces for interacting with external credential-receiving systems further comprises a visual display area.

5. The device of claim 1, wherein one of the plurality of distinct interfaces for interacting with external credential-receiving systems further comprises a magnetic stripe emulator.

6. The device of claim 1, wherein one of the plurality of distinct interfaces for interacting with external credential-receiving systems further comprises a smart card contact pad.

7. The device of claim 1, wherein one of the plurality of distinct interfaces for interacting with external credential-receiving systems further comprises an antenna.

8. The device of claim 7, wherein the antenna further comprises an RFID antenna and chips supporting operating frequencies from 800 MHz to 2.45 GHz.

9. The device of claim 8, wherein the device remains in a semi-active mode until activated by the biometric sensor.

10. The device of claim 1, wherein one of the plurality of distinct interfaces for interacting with external credential-receiving systems further comprises an alphanumeric display emulating a bar code.

11. The device of claim 1, wherein the power source further comprises an on-board battery.

12. The device of claim 1, wherein one of the plurality of distinct interfaces for interacting with external credential-receiving systems further comprises a USB connector.

13. The device of claim 1, wherein one of the plurality of distinct interfaces for interacting with external credential-receiving systems further comprises SMS messaging.

14. The device of claim 1, wherein one of the plurality of distinct interfaces for interacting with external credential-receiving systems further comprises GPS circuitry.

15. The device of claim 1, wherein a form factor of the device conforms with the physical requirements of standard magnetic strip cards and smart cards as specified by ISO 7811 and ISO 7816.

16. The device of claim 1, wherein a form factor of the device conforms generally to a key fob.

17. The device of claim 1, wherein a form factor of the device conforms generally to a pager.

18. The device of claim 1, wherein the operational software prevents use of the device until an authorized user is identified by the biometric sensor.

19. A data processing system for integrating and controlling multiple secure credentialing applications using a compact, self-powered, biometrically protected device, the system comprising:
   (a) a portable, hand-held, programmable device having a biometric sensor, control circuitry, a microprocessor, a memory storing security policies, personnel data, biometric data, a plurality of credentialing applications, a plurality of credentials, a power source, a plurality of distinct interfaces to external credential-receiving systems, and operational software, all of the above being integrated on a single device; and
   (b) an enrollment system interacting with a security authority, a device holder and with the programmable device to implement the security policies, enable identification and verification of the device holder through the biometric sensor, and associating the biometric data with a credentialing application, a security policy, and with a credential;
   (c) the operational software executing on the microprocessor, implementing the security policies, and preventing the use of the device until an authorized user is identified by the biometric sensor;
   (d) the credentialing application executing on the microprocessor, requesting a credential from the memory, selecting one of the plurality of distinct interfaces for credential distribution and presenting the credential to an external credential-receiving system through the selected one of the plurality of distinct interfaces.

20. The data processing system of claim 19, wherein the enrollment system further comprises:
   (a) an enrollment station interacting with the programmable device to create and manage access to the programmable device;
   (b) security control equipment operating over a defined control area to track the location of authorized personnel throughout the control area and to monitor an alert status of the device and to track the location of unauthorized entries in the control area; and
   (c) a communications process managing communications with security personnel, controlling access to a communications network, and updating, adding, and removing credential information in the programmable device.

21. A data processing method for integrating and controlling multiple secure credential-emulating applications executing on a compact, self-powered, biometrically-protected device, comprising the steps of:
   (a) establishing, on an enrollment station, a policy database determining access control rules and credential authority;
   (b) inserting a blank biometrically-protected device into the enrollment station;
   (c) loading security policies and a plurality of credential-emulating applications from the enrollment station into the biometrically-protected device;
   (d) loading personnel data from a personnel database and credentials from the enrollment station into the biometrically-protected device;
   (e) a user placing at least one finger on a fingerprint sensor on the biometrically-protected device;
   (f) storing fingerprint data on the biometrically-protected device and associating the stored fingerprint data with the personnel data, a security policy, and credentials;
   (g) removing the device from the enrollment station;
   (h) at a future time, the user using the fingerprint sensor as a selector to choose one of the plurality of credential-emulating applications and activating the chosen one of the plurality of credential-emulating applications executing on the biometrically-protected device only if at least one of the user's fingerprints matches the stored fingerprint data; and
   (i) transferring an activated emulated credential from the credential-emulating application to an external credential-receiving system expecting the credential.

22. The data processing method of claim 21, wherein the step of using the fingerprint sensor as a selector to choose one of the plurality of credential-emulating applications and activating the chosen one of the plurality of credential-emulating application executing on the biometrically-protected device further comprises the steps of:
   (a) the user placing at least one finger on the fingerprint sensor on the biometrically-protected device;
   (b) comparing the user's fingerprint to the stored fingerprint data on the biometrically-protected device; and
   (c) activating the chosen credentialing application on the biometrically-protected device if the user's fingerprint data matches the stored fingerprint data.

23. The data processing method of claim 22, further comprising the step of requesting voice print data from the user and comparing the user's voice print to voice print data stored on the biometrically-protected device before step 24(c).

24. The data processing method of claim 22, further comprising the step of transforming the fingerprint sensor into an application selector whereby the user can select a credential-emulating application before step 24(c).

25. The data processing method of claim 21, further comprising the step of detecting the presence of the biometrically-protected device and comparing a device ID number on the biometrically-protected device to a list of approved device ID's.

26. The data processing method of claim 25, further comprising the step of matching the user's fingerprint data with fingerprint data stored on the biometrically-protected device.

27. The data processing method of claim 25, further comprising the step of disabling the biometrically-protected device if the device ID number does not match the list of approved device ID's.

28. A self-contained identity management apparatus integrated on a single portable, hand-held, programmable device, comprising:
   (a) a biometric sensor;
   (b) a microprocessor;
   (c) a memory containing security policies, personnel data, biometric data, operational software, a plurality of credentials, and executable software implementing a plurality of credentialing applications executable by the microprocessor;
   (d) a self-contained power source; and
   (e) a plurality of distinct interfaces to external credential-receiving systems;
   (f) the operational software executing on the microprocessor, implementing the security policies, associating the biometric data with a credentialing application, a security policy, and with the plurality of credentials, and enabling identification and verification of a device holder through the biometric sensor; and the credentialing application executing on the microprocessor, requesting a credential from the memory, selecting one of the plurality of distinct interfaces to external credential-receiving systems for credential distribution, and presenting the credential to an external credential-receiving system through the selected one of the plurality of distinct interfaces.

29. The apparatus of claim 28, wherein the biometric sensor is a fingerprint sensor and wherein the fingerprint sensor also acts as a selector for selecting one of the plurality of credentialing applications.

30. The apparatus of claim 28, wherein the plurality of distinct interfaces to the external credential-receiving systems is are selected from the group consisting of an alphanumeric display emulating a bar code, a tone generator, an LED, a visual display emulating a magnetic stripe, and a smart card contact pad.

31. The data processing method of claim 21, further comprising at least one repetition of steps h and i.

32. A data processing method for integrating and controlling multiple secure credential-emulating applications executing on a compact, self-powered, biometrically-protected device, comprising the steps of:
   (a) establishing, on an enrollment station, a policy database determining access control rules and credential authority;
   (b) inserting a blank biometrically-protected device into a the enrollment station;
   (c) loading security policies from the policy database and a plurality of credential-emulating applications from the enrollment station into the biometrically-protected device;
   (d) loading personnel data from a personnel database and credentials from the enrollment station into the biometrically-protected device;
   (e) a user placing at least one finger on a fingerprint sensor on the biometrically-protected device;
   (f) storing fingerprint data on the biometrically-protected device and associating the stored fingerprint data with the personnel data, a security policy, and credentials;
   (g) removing the device from the enrollment station;
   (h) at a future time, the user using the fingerprint sensor as a select/scroll touch sensitive control pad to choose one of the plurality of credential-emulating applications and activating the chosen one of the plurality of credential-emulating applications executing on the biometrically-protected device only if at least one of the user's fingerprints matches the stored fingerprint data;

(i) activating one of a plurality of distinct interfaces to external systems based on the selected credential-emulating application;
(j) application over the activated interface to an external system expecting the credential;
(k) wherein the fingerprint sensor acts as a finger platen or mouse to scroll and select a credential from the plurality of credentials stored in the memory.

33. A data processing method for integrating and controlling multiple secure credential-emulating applications executing on a compact, self-powered, biometrically-protected device, comprising the steps of:
(a) a user placing at least one finger on a fingerprint sensor on the biometrically-protected device;
(b) storing fingerprint data on the biometrically-protected device and associating the stored fingerprint data with the user;
(c) the user using the fingerprint sensor as a select/scroll touch sensitive control pad to choose one of a plurality of credential-emulating applications executing on the biometrically-protected device and activating the chosen one of the plurality of credential-emulating applications only if at least one of the user's fingerprints matches the stored fingerprint data;
(d) transferring the activated emulated credential from the credential-emulating application to an external system expecting the credential;
(e) receiving information form the external system;
(f) the user using the fingerprint sensor as a select/scroll touch sensitive control pad to choose another one of the plurality of credential-emulating applications and activating the other one of the plurality of credential-emulating applications executing on the biometrically-protected device;
(g) transferring the activated emulated credential from the other credential-emulating application to a second external system expecting the credential; and
(h) transferring the information received in step (e) to the second external system.

34. An enrollment system for a portable, hand-held, programmable device for integrating and controlling multiple secure credentialing applications and for interacting with external systems, comprising:
(a) a policy database containing security policies, the security policies determining access control rules and credential authority;
(b) a personnel database containing personnel data and credentials for a user of the portable, hand-held, programmable device;
(c) a microprocessor executing technology processes and accessing the policy database to implement technology levels required to implement the security policies; and
(d) a read/write device receiving a blank, portable, hand-held device for integrating and controlling multiple secure credentialing applications and for interacting with external credential-receiving systems, the read/write device loading secure credentialing applications, the personnel data, and the credentials into a memory on the portable, hand-held device; requesting biometric data from a user; associating the biometric data with the personnel data, a security policy, and the credentials, and storing the biometric data in the memory of the portable, hand-held device.

35. The enrollment system of claim 34, wherein the technology levels are selected from the group consisting of: timers, power management, encryption, applications to be run, order of processes, communication channels, communication frequencies, update policies, command center controls, transaction logging, panic modes, and display data.

36. The enrollment system of claim 34, wherein the enrollment system tests the portable, hand-held device by powering up the device and rejecting the device if the device fails the test.

37. The data processing method of claim 21, further comprising the step of the enrollment station executing technology processes accessing the policy database to implement technology levels required to implement the security policies.

38. The data processing method of claim 37, wherein the technology levels are selected from the group consisting of: timers, power management, encryption, applications to be run, order of processes, communication channels, communication frequencies, update policies, command center controls, transaction logging, panic modes, and display data.

39. The data processing method of claim 38, wherein the enrollment station tests the portable, hand-held device by powering up the device and rejecting the device if the device fails the test.

40. The data processing method of claim 32, further comprising the step of the enrollment station executing technology processes accessing the policy database to implement technology levels required to implement the security policies.

41. The data processing method of claim 40, wherein the technology levels are selected from the group consisting of: timers, power management, encryption, applications to be run, order of processes, communication channels, communication frequencies, update policies, command center controls, transaction logging, panic modes, and display data.

42. The data processing method of claim 41, wherein the enrollment station tests the portable, hand-held device by powering up the device and rejecting the device if the device fails the test.

43. The device of claim 1, further comprising an application updating one of the plurality of credentials.

44. The device of claim 43, wherein the security policies stored in the memory control the ability of the credential-updating application to update one of the plurality of credentials.

45. The device of claim 21, further comprising the step before step (i) of the credential-emulating application activating one of a plurality of distinct interfaces with external credential-receiving systems.

46. The apparatus of claim 28, further comprising an application updating one of the plurality of credentials.

47. The apparatus of claim 46, wherein the security policies stored in the memory control the ability of the credential-updating application to update one of the plurality of credentials.

* * * * *

UNITED STATES PATENT AND TRADEMARK OFFICE
CERTIFICATE OF CORRECTION

| | | |
|---|---|---|
| PATENT NO. | : 7,715,593 B1 | Page 1 of 1 |
| APPLICATION NO. | : 10/867897 | |
| DATED | : May 11, 2010 | |
| INVENTOR(S) | : William Mark Adams et al. | |

It is certified that error appears in the above-identified patent and that said Letters Patent is hereby corrected as shown below:

In column 24, line 33, claim 30, after "tems" and before "are", delete "is"

In column 24, line 47, claim 32, after "into", delete "a"

In column 25, line 4, claim 32, after "(j)" and before "application", insert -- transferring the activated emulated credential --

In column 25, line 5, claim 32, after "credential;" insert -- and --

Signed and Sealed this

Seventeenth Day of August, 2010

David J. Kappos
*Director of the United States Patent and Trademark Office*